US008259958B2

(12) United States Patent
Nishimura

(10) Patent No.: US 8,259,958 B2
(45) Date of Patent: Sep. 4, 2012

(54) ENGINE SOUND CONTROL APPARATUS AND CONTROL METHOD

(75) Inventor: Yasuhiko Nishimura, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 1159 days.

(21) Appl. No.: 12/084,420

(22) PCT Filed: Oct. 24, 2006

(86) PCT No.: PCT/IB2006/002982
§ 371 (c)(1), (2), (4) Date: May 1, 2008

(87) PCT Pub. No.: WO2007/052105
PCT Pub. Date: May 10, 2007

(65) Prior Publication Data
US 2009/0136054 A1 May 28, 2009

(30) Foreign Application Priority Data
Nov. 1, 2005 (JP) ................................ 2005-318302

(51) Int. Cl.
*H04B 1/00* (2006.01)

(52) U.S. Cl. .......... 381/86; 381/61; 381/71.4; 381/73.1; 381/389

(58) Field of Classification Search .................... 381/61, 381/71.4, 71.9, 86, 73.1, 98, 389
See application file for complete search history.

(56) References Cited

U.S. PATENT DOCUMENTS 2,790,326 A * 4/1957 Blackstock et al. ............ 74/333
3,693,749 A * 9/1972 Motsinger et al. ............ 181/206
4,452,079 A * 6/1984 Tiller ............................. 73/488
5,222,148 A * 6/1993 Yuan ............................ 381/71.9
5,596,140 A * 1/1997 Boyce et al. ..................... 73/105
6,234,990 B1 * 5/2001 Rowe et al. ...................... 604/22
6,466,674 B1 * 10/2002 Norris ............................. 381/93
2008/0239876 A1 * 10/2008 Norris et al. ................. 367/139
(Continued)

FOREIGN PATENT DOCUMENTS

DE 34 20 463 12/1985
(Continued)

OTHER PUBLICATIONS

International Search Report.

(Continued)

*Primary Examiner* — David S. Warren
(74) *Attorney, Agent, or Firm* — Finnegan, Henderson, Farabow, Garrett & Dunner, LLP

(57) ABSTRACT

An engine sound control apparatus capable of arranging a sound of a frequency that is lower than the fundamental-order frequency of the engine. The engine sound control apparatus detects the frequency of the engine sound and generates a sound signal of a frequency that is in accordance with a control signal and outputting the sound signal generated by the oscillator. Through the interaction between the sound generated by the apparatus and the engine sound, occupants in the passenger compartment will perceive a sound of a frequency that is equal to the difference between the generated sound and the fundamental-order sound. This yields a sound that is lower in frequency than the fundamental-order sound without actually generating a sound of a frequency that is lower than that of the fundamental-order sound.

28 Claims, 8 Drawing Sheets

U.S. PATENT DOCUMENTS

| | | | | |
|---|---|---|---|---|
| 2008/0285775 | A1* | 11/2008 | Christoph et al. | 381/99 |
| 2008/0310642 | A1* | 12/2008 | Sakamoto et al. | 381/61 |
| 2009/0116660 | A1* | 5/2009 | Croft et al. | 381/77 |
| 2009/0136054 | A1* | 5/2009 | Nishimura | 381/71.4 |

FOREIGN PATENT DOCUMENTS

| | | |
|---|---|---|
| DE | 197 46 523 | 5/1998 |
| EP | 1 087 376 | 3/2001 |
| GB | 2 354 872 | 4/2001 |
| JP | 60-32518 | 2/1985 |
| JP | 1-140199 | 6/1989 |
| JP | 2-022674 | 5/1990 |
| JP | 5-209563 | 8/1993 |
| JP | 5-341796 | 12/1993 |
| JP | 6-27970 | 2/1994 |
| JP | 6-348280 | 12/1994 |
| JP | 7-024069 | 1/1995 |
| JP | 7-168583 | 7/1995 |
| JP | 11-033121 | 2/1999 |
| JP | 11-141350 | 5/1999 |
| JP | 2002-041049 | 2/2002 |
| WO | WO 2004/036001 | 4/2004 |

OTHER PUBLICATIONS

Written Opinion of the ISR.
Japanese Office Action dated Nov. 11, 2008.
Japanese Office Action dated Mar. 24, 2009.

* cited by examiner

ENGINE SOUND CONTROL APPARATUS AND CONTROL METHOD

BACKGROUND OF THE INVENTION

1. Field of Invention

The invention relates to an engine sound control apparatus and control method that controls sounds generated by the actions of an internal combustion engine in a motor vehicle or the like.

2. Description of Related Art

A technology that controls the sound quality through interference between a booming sound, generated in the vehicle cabin mainly due to the vibratory noises of the engine, and a canceling sound is known (see, e.g., Japanese Patent Application Laid-Open Publication No. JP-A-HEI 6-27970). In the described technology, a specific frequency component of the primary source alone is left uncanceled, so that a sound of the specific frequency component is transmitted to the passenger compartment.

However, according to the above-described related art, since a sound actually generated by the engine is transmitted to the passenger compartment, it is difficult for passengers in a vehicle equipped with a multi-cylinder engine whose fundamental-order frequency is high to perceive a low frequency sound.

SUMMARY OF THE INVENTION

The invention provides an engine sound control apparatus and control method that arranges the sound of a frequency that is below the fundamental-order frequency of the engine.

In order to achieve the object, an engine sound control apparatus in accordance with a first aspect of the invention comprises a sound output device for outputting, relative to a sound of a fundamental-order frequency of an engine, a sound of a frequency whose frequency difference from the fundamental-order frequency is in a predetermined range.

In this engine sound control apparatus, when the sound output device activates to add to a sound of the fundamental-order frequency of the engine (hereinafter, referred to as "fundamental-order sound"), a sound whose frequency difference is within a predetermined range (hereinafter, referred to as "addition sound"), occupants perceive, due to the human hearing characteristic, a sound of a frequency that is equal to the difference between the addition sound and the fundamental-order sound. That is, it becomes possible to arrange a sound that is lower in frequency than the fundamental-order sound without actually generating a sound of a frequency that is lower than that of the fundamental-order sound.

Thus, the engine sound control apparatus of the first aspect is able to arrange a sound of a frequency that is lower than the fundamental-order frequency of the engine. The fundamental order of the engine is determined by the number of combustion events in the engine for each rotation of the crankshaft. For example, in a four-cycle eight-cylinder engine, the fundamental order is the fourth-order component of the engine rotation speed.

An engine sound control apparatus in accordance with a second aspect of the invention may comprise frequency detection means for detecting a frequency of a sound of an engine, a sound output device capable of outputting a sound of a frequency that is in accordance with a control signal, and a control device that outputs the control signal to the sound output device so as to add to a sound of a fundamental-order frequency of the engine, a sound of a frequency component whose frequency difference from the fundamental-order frequency is in a predetermined range, based on a detection signal of the frequency detection means.

In the engine sound control apparatus of the second aspect, the control device detects the fundamental-order frequency of the engine on the basis of the detection signal of the frequency detection means, and outputs the control signal to the sound output device so as to add to a sound of the fundamental-order frequency (hereinafter, referred to as "fundamental-order sound") a sound whose frequency difference from the fundamental-order frequency is in a predetermined range (hereinafter, referred to as "addition sound"). Then, the sound output device activates to add the addition sound to the fundamental-order sound. Therefore, occupants perceive, due to the human hearing characteristic, a sound of a frequency equal to the frequency difference between the addition sound and the fundamental-order sound. That is, it becomes possible to arrange a sound that is lower in frequency than the fundamental-order sound without actually generating a sound of a frequency that is lower than that of the fundamental-order sound. Furthermore, because the control device controls the sound output device on the basis of information regarding the fundamental-order frequency of the engine, it becomes possible to perform sound arrangement with a higher degree of freedom, for example, to change the frequency of the sound of arrangement in accordance with the state of operation of the vehicle, or the like.

Thus, the engine sound control apparatus of the second aspect is able to arrange a sound of a frequency that is lower than the fundamental-order frequency of the engine. The fundamental order of the engine is determined by the number of combustion events in the engine for each rotation of the crankshaft. For example, in a four-cycle ten-cylinder engine, the fundamental order is the fifth-order component of the engine rotation speed.

An engine sound control apparatus according to a third aspect is similar to that of the second aspect, but may further comprise a level detection means for detecting the sound level of the fundamental-order frequency of the engine. In particular, the sound whose frequency difference from the fundamental-order frequency is in the predetermined range also has a sound level difference from the sound of the fundamental-order frequency is in a predetermined range.

In the engine sound control apparatus of the third aspect, the control device detects the level (magnitude) of the fundamental-order sound on the basis of the detection signal of the level detection means, and outputs the control signal to the sound output device to generate a sound of a specific frequency whose frequency difference from the fundamental-order sound is in a predetermined range and whose level difference from the fundamental-order sound is in a predetermined range (if there is no background sound, only the addition sound occurs). Therefore, occupants will reliably hear a sound of a frequency equal to the frequency difference between the addition sound and the fundamental-order sound.

In an engine sound control apparatuses of a fourth aspect based on any one of the first to third aspects, the sound output device may include a sound signal generation portion that generates a sound signal independently of the engine, and a sound output portion that outputs, as a sound, the sound signal generated by the sound signal generation portion.

In the engine sound control apparatus of the fourth aspect, the sound signal generation portion of the sound output device generates the sound signal independently of the engine, and the output portion of the sound output device outputs the sound signal. Therefore, the frequency and magnitude of the addition sound can be freely set, that is, the degree of freedom in the sound arrangement is high.

In an engine sound control apparatus of a fifth aspect, which may be based on any one of the first to third aspects, the sound output device may include an addition sound adjustment portion capable of changing the frequency or amplitude of a sound caused by an action of the engine.

In the engine sound control apparatus of the fifth aspect, a sound or vibration caused by the action of the engine is adjusted in at least one of frequency and level to form an addition sound by the addition sound adjustment portion of the sound output device, and the addition sound is added to the fundamental-order sound. Therefore, a sound of a frequency that below the fundamental-order frequency can be arranged in a construction that requires only a few or no extra component parts for generating the addition sound.

An engine sound control apparatus of according to the sixth aspect is similar to that of the fifth aspect, except that the addition sound adjustment portion adjusts one of the frequency and the level of the sound added to the sound of the fundamental-order frequency of the engine by changing a frequency characteristic of an intake system or an exhaust system of the engine.

In the engine sound control apparatus of the sixth aspect, a frequency conversion portion generates an addition sound by changing the frequency characteristic of an existing component part of the intake system or the exhaust system, for example, the resonator, the muffler, etc.

An engine sound control apparatus according to a seventh aspect of the invention, may be based on any one of the first to sixth aspects; however, the sound added by the sound output device may be higher in frequency than the sound of the fundamental-order frequency of the engine.

In the engine sound control apparatus of the seventh aspect, a sound of a frequency lower than the fundamental-order frequency is arranged by adding a sound of a frequency higher than the fundamental-order frequency to the fundamental-order sound. Because the addition sound is higher in frequency than the fundamental-order sound, there is a low possibility that the addition sound will cause a booming sound. Furthermore, the sound output device that generates a high-frequency sound (particularly, the sound output portion described above in conjunction with the fourth aspect, or the like) can be reduced in size, in comparison with a device that generates a low-frequency sound.

Furthermore, in order to achieve the aforementioned object, an engine sound control apparatus of an eighth aspect changes the frequency characteristic of the site of generation or transmission of an engine sound so that, of the engine sound, a difference in sound level between a sound of a fundamental-order frequency and a sound of a frequency component of an order that is different from the order of the fundamental-order frequency becomes equal to a predetermined level difference in a cabin.

In the engine sound control apparatus of the eighth aspect, the frequency characteristic of a site of engine sound generation, such as the engine itself, the intake system, the exhaust system, the vehicle body support system, etc., is changed in accordance with the engine rotation speed, so that, of the engine sound, the sound of the fundamental-order frequency (hereinafter, referred to as "fundamental-order sound") decreases in the level, or the sound of a frequency component of an order different from the fundamental order (hereinafter, referred to as "addition sound") increases in the level. As a result, the sound level difference between the fundamental-order sound and the addition sound is within a predetermined range. Therefore, occupants perceive, due to the human hearing characteristic, a sound of a frequency that is equal to the frequency difference between the addition sound and the fundamental-order sound. That is, it becomes possible to arrange a sound that is lower in frequency than the fundamental-order sound without actually generating a sound of a frequency that is lower than that of the fundamental-order sound.

Thus, the engine sound control apparatus of the eighth aspect is able to arrange a sound of a frequency that is lower than the fundamental-order frequency of the engine. The fundamental order of the engine is determined by the number of combustion events in the engine for each rotation of the crankshaft. For example, in a four-cycle twelve-cylinder engine, the fundamental order is the sixth-order component of the engine rotation speed.

As described above, the engine sound control apparatus in accordance with the invention is able to arrange a sound of a frequency that is lower than the fundamental-order frequency of the engine.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

An engine sound control apparatus 10 in accordance with a first embodiment of the invention will be described with reference to FIGS. 1A, 1B and 2.

Figure 1A:
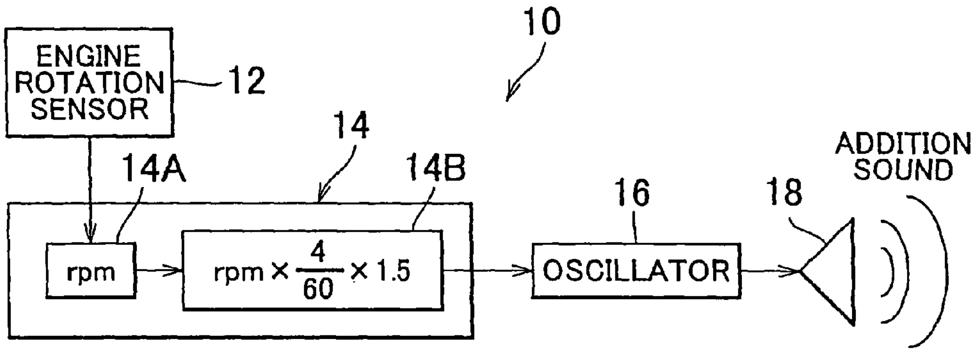
FIG. 1A is a block diagram showing an engine sound control apparatus in accordance with a first embodiment of the invention.
Figure 2:
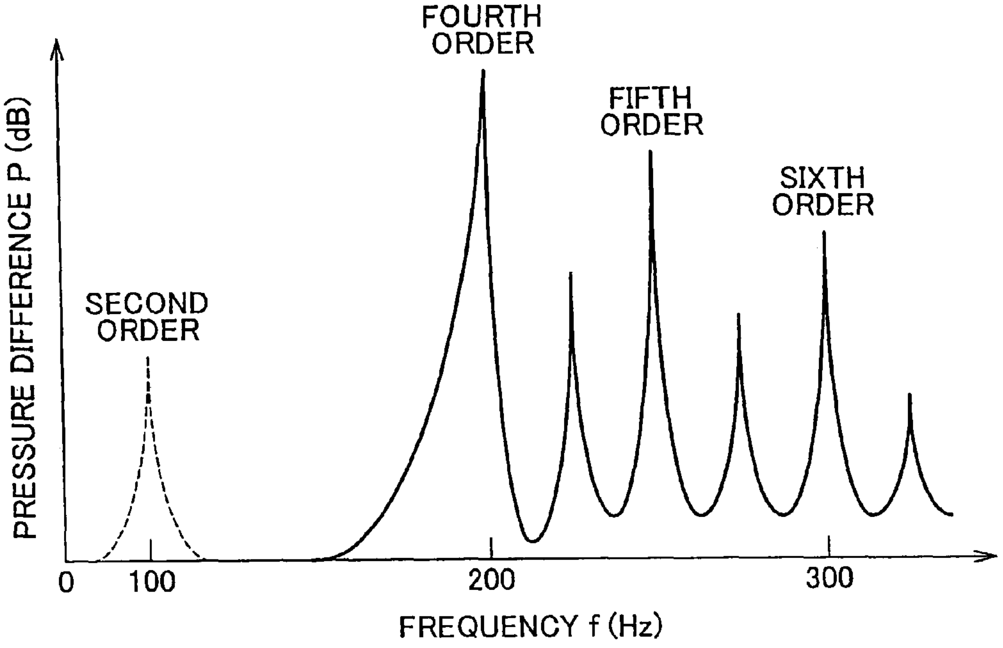
FIG. 2 is a diagram showing a frequency characteristic of a sound of an engine of a motor vehicle equipped with the engine sound control apparatus in accordance with the first embodiment of the invention.

FIG. 1A shows in a schematic block diagram an overall construction of the engine sound control apparatus 10. As shown in this drawing, the engine sound control apparatus 10 is constructed of an engine rotation sensor 12 as frequency detection means, a sound arrangement ECU 14 as a control device, and an oscillator 16 and a speaker 18 as a sound addition device, which are main component elements of the apparatus 10. The engine sound control apparatus 10 is constructed so that the sound arrangement ECU 14 causes the oscillator 16 to generate a sound signal on the basis of a detection signal of the engine rotation sensor 12, and causes the speaker 18 to output a sound that is in accordance with the sound signal, thereby causing an attractive sound to be heard by an occupant in a cabin to which the invention is applied. Concrete descriptions will be given below.

The engine rotation sensor 12 outputs a signal that is in accordance with the number of rotations of an internal combustion engine (not shown) provided in a motor vehicle equipped with the engine sound control apparatus 10. In this embodiment, the internal combustion engine is a four-cycle eight-cylinder engine in which four combustion strokes occur in every rotation of the crankshaft.

The sound arrangement ECU 14 has a rotation number computation portion 14A that obtains the rotation speed of the engine on the basis of the output signal of the engine rotation sensor 12, and an addition sound frequency computation portion 14B that computes a frequency of the sound signal that the oscillator 16 is caused to generate on the basis of a result of computation of the rotation number computation portion 14A. The rotation number computation portion 14A and the addition sound frequency computation portion 14B may be constructed as circuits, or may also be constructed as software functions. Furthermore, the frequency to be output by the addition sound frequency computation portion 14B may be computed directly from the signal of the engine rotation sensor 12.

The addition sound frequency computation portion 14B of the sound arrangement ECU 14 generates a frequency that is 1.5 times the fundamental-order frequency of the engine. Herein, the fundamental-order frequency fb of the engine is equal to the number of combustion events per second. In engines that undergo four combustion strokes in every rotation as mentioned above, the fundamental-order frequency fb is given as $fb=N\times(4/60)$ where N is the engine rotation speed (rpm). That is, in four-cycle eight-cylinder internal combustion engines, the fundamental order is the fourth order, that is, the frequency of the engine is four times the engine rotation speed. As shown in FIG. 2, sounds of orders a lower than the fundamental order (e.g., sound of the second order indicated by a broken line) do not occur, or are at low level, if any occurs.

The oscillator 16 generates a sound signal of a frequency that is 1.5 times the fundamental-order frequency fb (i.e., sixth order) of the engine on the basis of the frequency signal output by the addition sound frequency computation portion 14B, and then outputs the signal to the speaker 18. The speaker 18 outputs a sound toward occupants of the cabin. Upon input of the sound signal from the oscillator 16, the speaker 18 outputs an addition. sound whose frequency is 1.5 times the fundamental-order frequency fb.

Next, operation of the-first embodiment will be described.

First Embodiment

In a motor vehicle equipped with the engine sound control apparatus 10 constructed as described, while the engine is operating and an engine sound (including not only the sound generated by the engine itself, but also the intake sound and the exhaust sound that occur in association with the actions of the engine, and the sound caused by engine vibrations transmitted to the vehicle body or the like) is occurring, the engine sound control apparatus 10 is activated and the addition sound is output from the speaker 18.

Figure 1B:
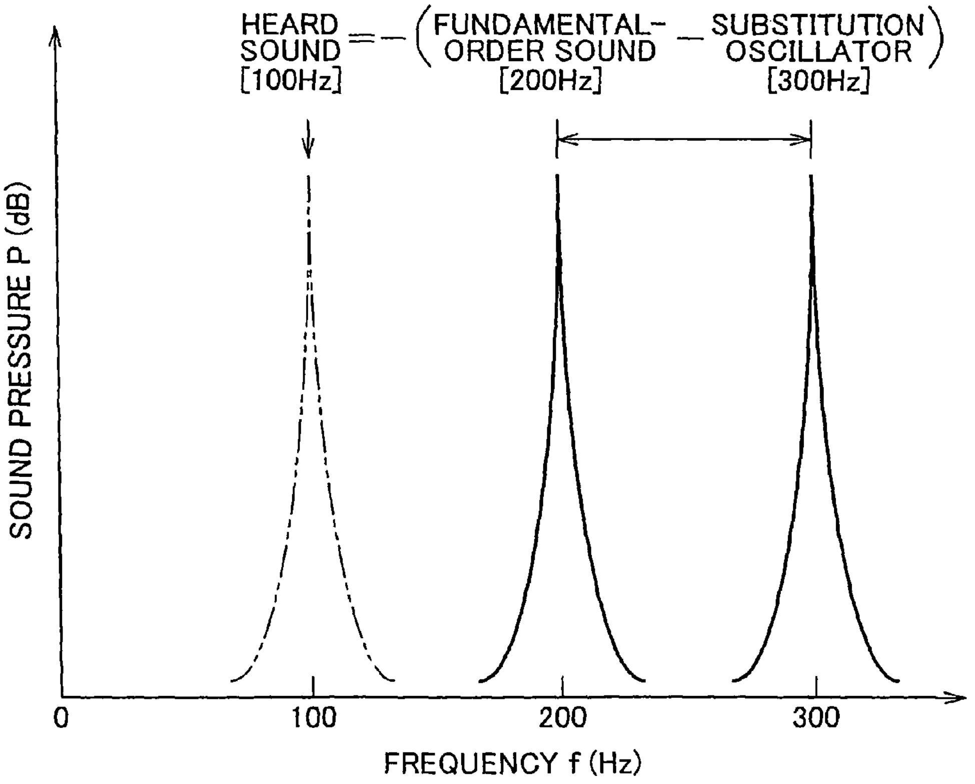
FIG. 1B is a diagram showing a sound arrangement principle of the engine sound control apparatus in accordance with the first embodiment of the invention.

Then, in the cabin of the motor vehicle, there are an engine sound, as indicated in FIG. 1B, whose main component is a component of the fundamental-order frequency of the engine (other frequency components are not shown), and the addition sound that is output by the speaker 18. In this state, motor vehicle occupants perceive, due to the human hearing characteristic, a sound of a frequency that is equal to a difference $\Delta f$ between the frequency fa of the addition sound and the frequency fb of the fundamental-order sound, even though a sound at that frequency has not been generated.

For example, if the engine rotation speed is 3000 rpm, the fundamental-order frequency fb is 200 Hz, and the frequency fa of the addition sound is 300 Hz, so that occupants will perceive a sound of 100 Hz.

Thus, the engine sound control apparatus 10 in accordance with the first embodiment is able to arrange sounds of frequencies below the fundamental-order frequency fb of the engine.

Therefore, it is possible to arrange deep engine sounds emphasized in a low frequency range that is preferred as a cabin sound by users. In particular, as for high-grade vehicles whose users like the deepness of engine sounds, many of them are equipped with multi-cylinder engines, whose fundamental-order frequency fb is high so that it is difficult to arrange deep engine sounds. However, the engine sound control apparatus 10 realizes arrangement of deep engine sounds emphasized in a low frequency range in multi-cylinder engine-equipped vehicles.

Furthermore, the engine sound control apparatus 10 causes occupants to perceive a sound that has not actually been generated, by utilizing the human hearing characteristic, without outputting from the speaker 18 a low-frequency sound for arranging deepness. Therefore, the engine sound control apparatus 10 avoids occurrence of booming sound, which generally may occur where low-frequency sound is output from the speaker 18. In particular, in this embodiment, because the engine sound control apparatus 10 adds an addition sound of an order that is higher than that of the fundamental-order frequency fb, there is a low possibility that the problem of booming sound arise. Furthermore, since the addition sound of an order that is higher than that of the fundamental-order frequency fb, the speaker 18, an amplifier, etc. can be provided in a compact construction, in comparison with the construction in which a lower frequency sound is added. That is, the installation space, the weight and the cost of the apparatus can be reduced in comparison with the construction in which a low-frequency sound is added.

Although in the first embodiment, the addition sound of the sixth-order component of the engine rotation speed is added to the fundamental-order sound of the fourth-order component of the engine rotation speed, this does not limit the invention. For example, a sound of a different-order component may be added as an addition sound. Furthermore, it is also possible to add an addition sound of a frequency component equal to a frequency $(fb+\alpha)$ whose difference from the fundamental-order frequency fb is constant independently of the engine rotation speed. Furthermore, the order (frequency difference) of the addition sound may also be changed in accordance with the engine rotation speed.

Next, other embodiments of the invention will be described. The component parts and portions basically the same as those of the first embodiment or the aforementioned constructions are denoted by the same reference characters as those used for the first embodiment and the aforementioned constructions, and will not be described again.

Second Embodiment

Figure 3:
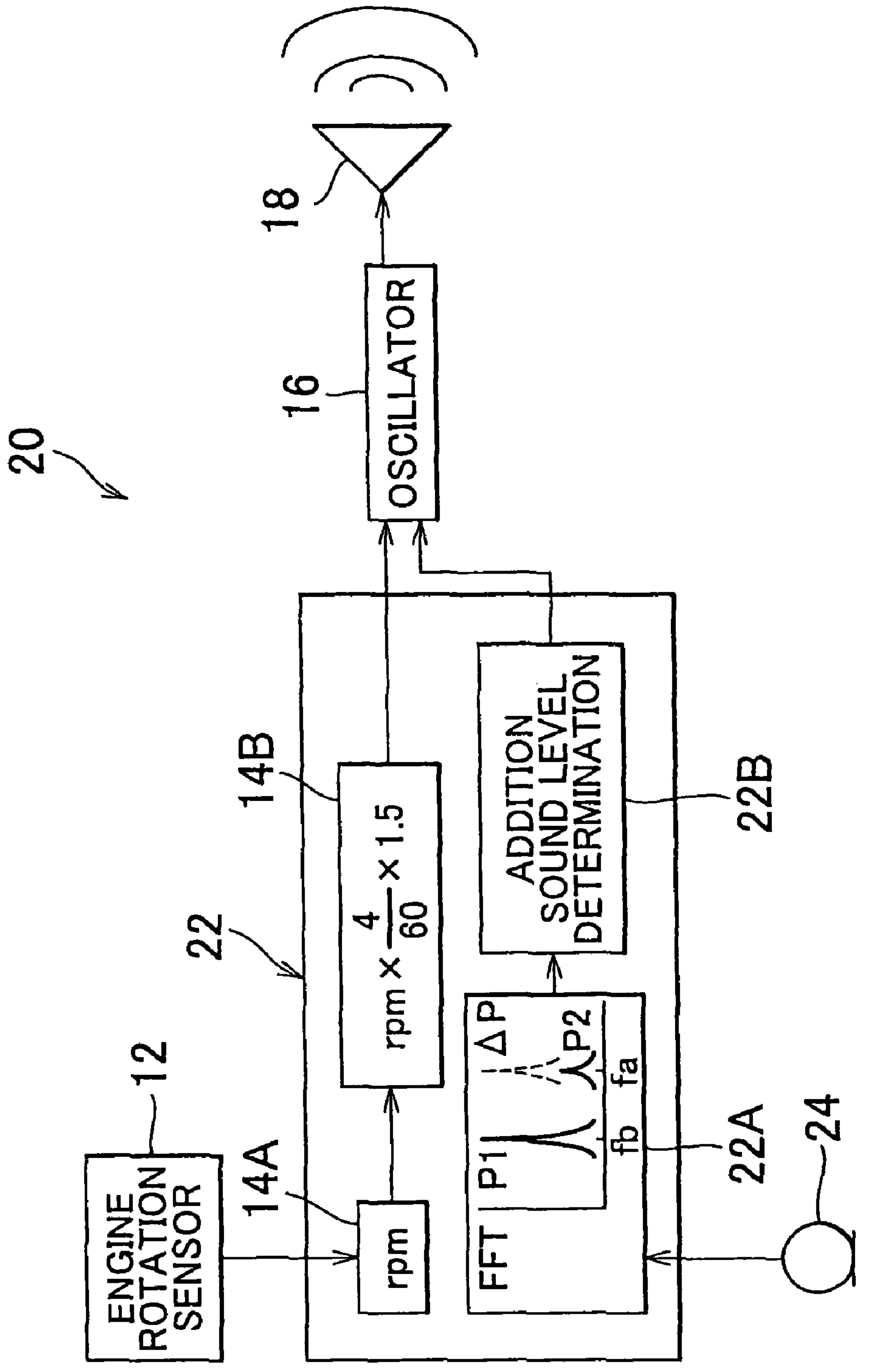
FIG. 3 is a block diagram showing an engine sound control apparatus in accordance with a second embodiment of the invention.

FIG. 3 shows in a block diagram an engine sound control apparatus 20 in accordance with a second embodiment of the invention. As shown in this drawing, the engine sound control apparatus 20 differs from the apparatus of the first embodiment in that the apparatus 20 has a sound arrangement ECU 22 in place of the sound arrangement ECU 14, and has a sound collector microphone 24 that forms a level detection means.

The sound arrangement ECU 22 has a sound level analysis portion 22A as a level detection means, and an addition sound level determination portion 22B that determines the level of the addition sound on the basis of a result of analysis performed by the sound level analysis portion 22A, in addition to the rotation number computation portion 14A and the addition sound frequency computation portion 14B. The sound level analysis portion 22A and the addition sound level determination portion 22B may be constructed as dedicated circuits, or may also be constructed as software functions. Furthermore, the frequency to be output by the addition sound level determination portion 22B may be computed directly from the signal of the engine rotation sensor 12.

The sound level analysis portion 22A performs fast Fourier transform (FFT) of the output signal of the sound collector microphone 24 that collects sounds in the vicinity of an occupant's ears in the cabin, and detects a sound level P1 of the fundamental-order frequency fb, and a sound level P2 of the frequency component (sixth-order component) that is the same as that of the addition sound.

The addition sound level determination portion 22B outputs a difference Pd between the sound level P1 of the fundamental-order sound and the sound level P2 of the sixth-order component to the oscillator 16 as a sound level of the addition sound of a frequency fa, which is to be output from the speaker 18. The oscillator 16 generates a sound signal on the basis of a frequency signal from the addition sound frequency computation portion 14B, and a level signal from the addition sound level determination portion 22B, and outputs the generated signal to the speaker 18. Therefore, the speaker 18 outputs an addition sound whose frequency fa is 1.5 times the fundamental-order frequency fb and whose sound level is Pd.

Furthermore, while the speaker 18 outputs the addition sound, the sound arrangement ECU 22 performs a feedback control such that the difference between the sound level P1 of the fundamental-order sound and the sound level P2 of the sixth-order component is within 3 dB (±3 dB).

In a motor vehicle equipped with the engine sound control apparatus 20 constructed as described above, while the engine is operating and engine sound is occurring, the engine sound control apparatus 20 activates so that the addition sound is output from the speaker 18. Then, in the cabin of the motor vehicle, there are an engine sound whose main component is a component of the fundamental-order frequency fb of the engine, and the sixth-order sound obtained by adding the addition sound that is output by the speaker 18. In this state, motor vehicle occupants perceive, due to the human hearing characteristic, a sound of a frequency equal to the difference Δf between the frequency fa of the sixth-order component and the frequency fb of the fundamental-order sound, even though a sound at that frequency has not been generated.

Thus, the engine sound control apparatus 20 in accordance with the second embodiment achieves substantially the same effect through substantially the same operation as in the engine sound control apparatus 10 in accordance with the first embodiment.

Furthermore, in the engine sound control apparatus 20, the sound arrangement ECU 22 controls the oscillator 16 so as to generate an addition sound of a sound level that is equal to the difference between the sound level P1 of the fundamental-order frequency fb and the sound level P2 of the sixth-order component, on the basis of the output signal of the sound collector microphone 24. Therefore, the level difference between the fundamental-order sound and the sixth-order component sound that contains the addition sound is ±3 dB.

Therefore, a sound of a low frequency equal to the difference between the fundamental-order frequency fb and the addition sound frequency fa can be reliably arranged in a desired frequency range. That is, although there exist regions of frequencies (rotation speeds) that are not proportional to the engine rotation speed, the level of the addition sound from the speaker 18 is adjusted in those frequency regions as well. Therefore, the sound level of the entire sixth-order component sound associated with the rotation of the engine are made substantially equal to the level of the fundamental-order sound, and a low-frequency sound that has not actually been generated can be arranged in a desired frequency range. Hence, a deep acceleration sound emphasized in a low-frequency range can be arranged, for example, in all the regions of acceleration of the motor vehicle.

Third Embodiment

Figure 4:
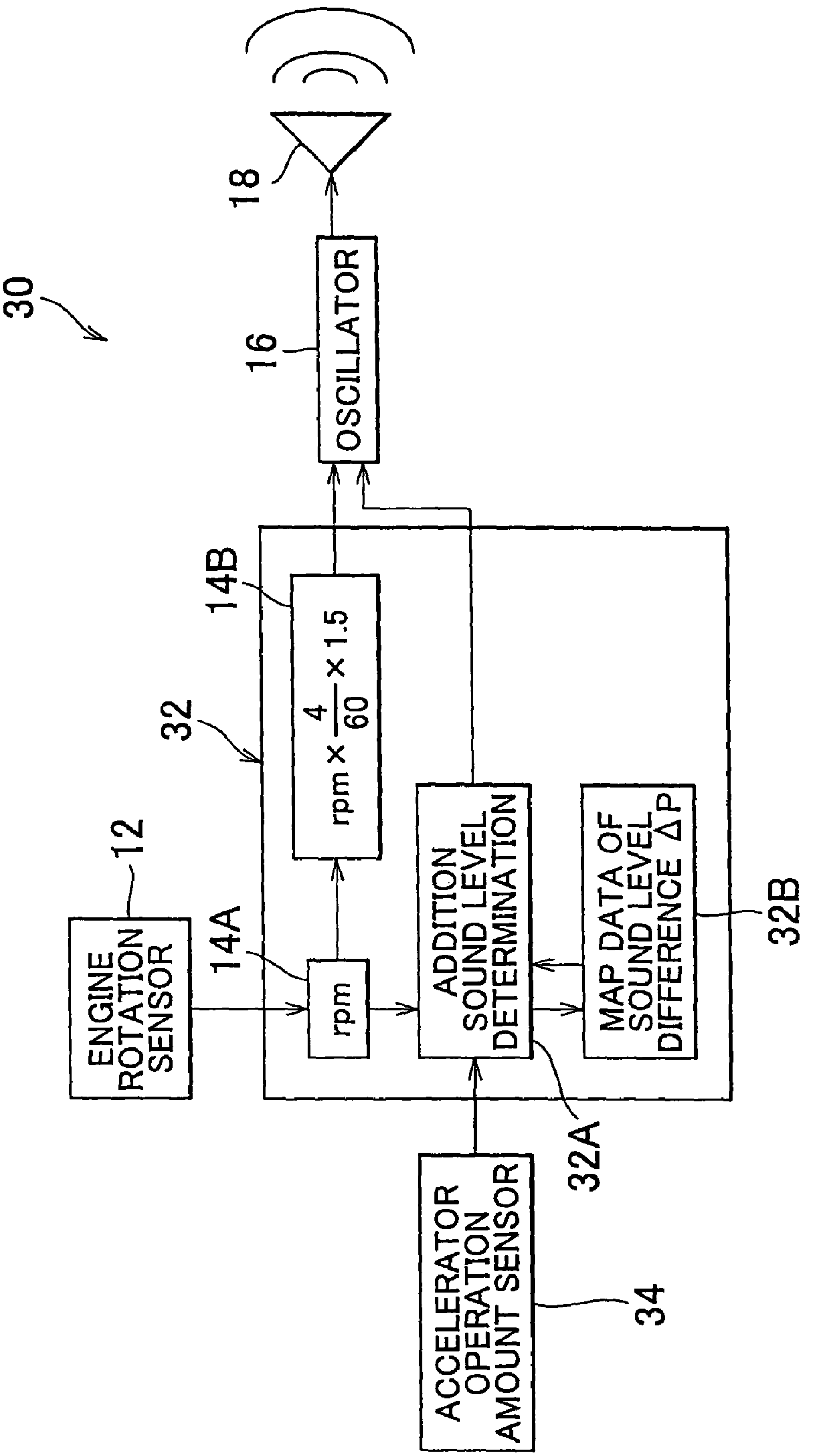
FIG. 4 is a block diagram showing an engine sound control apparatus in accordance with a third embodiment of the invention.

FIG. 4 shows in a block diagram an engine sound control apparatus 30 in accordance with a third embodiment of the invention. As shown in this drawing, the third embodiment differs from the second embodiment in that the engine sound control apparatus 30 has a sound arrangement ECU 32 in place of the sound arrangement ECU 22.

The sound arrangement ECU 32 has an addition sound level determination portion 32A, and a sound level difference map data storage portion 32B storing map data to which the addition sound level determination portion 32A refers in order to determine the level of the addition sound, as well as the rotation number computation portion 14A and the addition sound frequency computation portion 14B. In the sound level difference map data storage portion 32B, differences Pd between the sound level P1 of the fundamental-order component of the engine sound P and the sound level P2 of the sixth-order component are stored as two-axis map data of the engine rotation speed and the engine torque.

The addition sound level determination portion 32A is constructed so that a result of computation corresponding to the engine rotation speed is input from the rotation number computation portion 14A, and so that an accelerator operation amount signal, that is, a torque signal, is input from an accelerator operation amount sensor 34. Therefore, the addition sound level determination portion 32A extracts data of the difference Pd that is in accordance with the engine rotation speed and the accelerator operation (engine torque), from the sound level difference map data storage portion 32B, and then outputs it to the oscillator 16 as a sound level of the addition sound of the frequency fa which is to be output from the speaker 18.

The oscillator 16 generates a sound signal on the basis of the frequency signal from an addition sound frequency computation portion 14B, and a level signal from the addition sound level determination portion 32A, and outputs the sound signal to the speaker 18. Therefore, the speaker 18 outputs an addition sound whose frequency fa is 1.5 times the fundamental-order frequency fb and whose sound level is Pd.

In a motor vehicle equipped with the engine sound control apparatus 30 constructed as described above, while the engine is operating and an engine sound is occurring, the engine sound control apparatus 30 activates so that the addition sound is output from the speaker 18. Then, in the cabin of the motor vehicle, there are an engine sound whose main component is a component of the fundamental-order frequency fb of the engine, and the sixth-order sound obtained by adding the addition sound that is output by the speaker 18. In this state, motor vehicle occupants perceive, due to the human hearing characteristic, a sound of a frequency equal to the difference Δf between the frequency fa of the sixth-order component and the frequency fb of the fundamental-order sound, even though a sound at that frequency has not been generated.

Thus, the engine sound control apparatus 30 in accordance with the third embodiment achieves substantially the same effect through substantially the same operation as in the engine sound control apparatus 10 in accordance with the first embodiment.

Furthermore, in the engine sound control apparatus 30, the sound arrangement ECU 32 controls the oscillator 16 so as to generate an addition sound of a sound level that is equal to the difference between the sound level P1 of the fundamental-order frequency fb and the sound level P2 of the sixth-order component, on the basis of the engine rotation speed and torque information. Therefore, the level difference between the fundamental-order sound and the sixth-order component sound that contains the addition sound is kept substantially constant.

Therefore, a sound of a low frequency equal to the difference between the fundamental-order frequency fb and the addition sound frequency fa can be reliably arranged in a desired frequency range. That is, although there exist regions of frequencies (rotation speeds) that are not proportional to the engine rotation speed, the level of the addition sound from the speaker 18 is adjusted in those frequency regions as well. Therefore, the sound level of the entire sixth-order component sound associated with the rotation of the engine are made substantially equal to the level of the fundamental-order sound, and a low-frequency sound that has not actually been generated can be arranged in a desired frequency range. Hence, a deep acceleration sound emphasized in a low-frequency range can be arranged, for example, in all the regions of acceleration of the motor vehicle.

Fourth Embodiment

Figure 5:
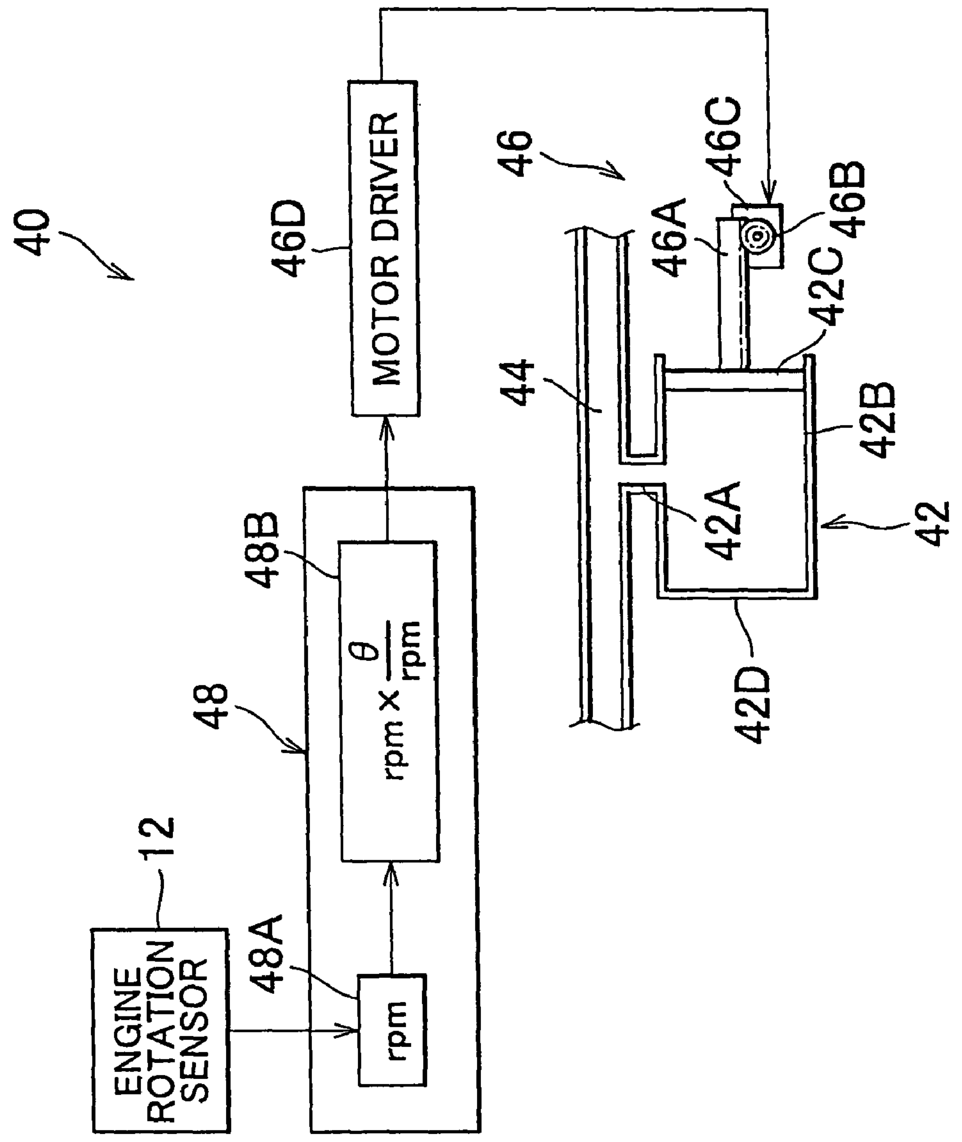
FIG. 5 is a block diagram showing an engine sound control apparatus in accordance with a fourth embodiment of the invention.

FIG. 5 shows in a block diagram an engine sound arrangement ECU 40 in accordance with a fourth embodiment of the invention. As shown in this drawing, the fourth embodiment differs from the foregoing embodiments in that the engine sound arrangement ECU 40 generates an addition sound by tuning a sound that occurs in association with the operation of the engine instead of outputting from the speaker the sound signal generated by the oscillator 16. Concretely, in this embodiment, a sixth-order component sound whose sound level P2 is substantially equal to the sound level P1 of the fundamental-order component is generated by changing the resonance characteristic of a resonator 42.

The resonator 42 has a resonance box 42B from which a small-diameter neck portion 42A protrudes. The neck portion 42A is connected to an air cleaner hose 44 that connects the engine and an air cleaner (not shown). This resonator 42 is a Helmholtz (resonance) type resonator in which an auxiliary vibration system with respect to the air cleaner hose 44 is constructed with the air in the neck portion 42A serving as a mass element, and the air in the resonance box 42B serving as a spring element.

The resonance box 42B is a cylinder with a closed bottom and having an open end, and defines a resonance chamber, together with a movable wall 42C fitted thereto. Thus, the resonator 42 is constructed so that the volume of the resonance chamber is changed by moving the movable wall 42C toward or away from a bottom portion 42D. In accordance with the volume of the resonance chamber, that is, the position of the movable wall 42C with respect to the resonance box 42B, the resonator 42 changes the resonance characteristic of the engine intake system.

The movable wall 42C of the resonator 42 is driven by a drive device 46 so as to move toward and away from the bottom portion 42D of the resonance box 42B. The drive device 46 includes a rack 46A which is fixed to the movable wall 42C and whose length extends in the direction of movements toward and away from the bottom portion 42D of the resonance box 42B, a pinion 46B meshing with the rack 46A, and a drive motor 46C capable of rotating the pinion 46B in the forward and backward directions. The drive motor 46C is a stepping motor that is driven by a motor driver (amplifier) 46D.

The motor driver 46D is controlled by a sound arrangement ECU 48. The sound arrangement ECU 48 has a rotation number computation portion 48A that obtains the rotation speed of the engine on the basis of an output signal of an engine rotation sensor 12, and a motor drive amount computation portion 48B that computes the rotation direction and the rotation amount θ of the drive motor 46C (the position of the movable wall 42C with respect to the resonance box 42B) on the basis of a result of computation of the rotation number computation portion 48A. The rotation number computation portion 48A and the motor drive amount computation portion 48B may be constructed as circuits, and may also be constructed as software functions. Furthermore, the rotation direction and the rotation amount θ of the drive motor 46C output by the motor drive amount computation portion 48B may be directly computed from the signal of the engine rotation sensor 12.

As for the resonator 42, the initial position of the movable wall 42C with respect to the resonance box 42B is set so that the sound level of the sixth-order component of the engine sound becomes substantially equal to (within the range of ±3 dB from) the sound pressure of the fundamental-order (fourth-order) component, in other words, so that the addition sound of the sixth component is generated (amplified). As for the setting of the addition sound, a setting of attenuating the sound level of the fundamental-order component may be used instead of or in combination with the setting of amplifying the sound level of the sixth-order component.

The sound arrangement ECU 48 activates the drive motor 46C for an amount proportional to the engine rotation speed so as to maintain a state where the sound pressure of the sixth-order component of the engine sound is substantially equal to the sound pressure of the fundamental-order component thereof, in accordance with the engine rotation speed. In this embodiment, a setting is made such that the resonance chamber is larger during low rotation speeds than during high rotation speeds.

In a motor vehicle equipped with the engine sound arrangement ECU 40 constructed as described above, while the engine is operating, the volume of the resonance chamber of the resonator 42 changes in accordance with the engine rotation speed so that the sound level of the fundamental-order component of the engine sound and the sound level of the sixth-order component are substantially equal. Therefore, occupants of the motor vehicle perceive, due to the human hearing characteristic, a sound of a frequency equal to a difference Δf between the frequency fa of the addition sound and the frequency fb of the fundamental-order sound, as indicated in FIG. 1B, even though a sound at that frequency has not been generated.

For example, if the engine rotation speed is 3000 rpm, the fundamental-order frequency fb is 200 Hz, and the frequency fa of the addition sound is 300 Hz, so that occupants will perceive a sound of 100 Hz.

Thus, the engine sound arrangement ECU 40 in accordance with the fourth embodiment is able to arrange sounds of frequencies that are lower than the fundamental-order frequency fb of the engine.

Therefore, it is possible to arrange a deep engine sound emphasized in a low frequency range that is liked as a cabin sound by users. In particular, as for high-grade vehicles whose users like the deepness of the engine sound, many of them are equipped-with multi-cylinder engines, whose fundamental-order frequency fb is high so that it is difficult to arrange a deep engine sound. However, the engine sound arrangement ECU 40 allows arrangement of a deep engine sound emphasized in a low frequency range in multi-cylinder engine-equipped vehicles.

Furthermore, the engine sound arrangement ECU 40 causes occupants to perceive a sound that has not actually been generated, by utilizing the human hearing characteristic, without the use of a low-frequency sound for arranging deepness. Therefore, the engine sound arrangement ECU 40 avoids occurrence of booming sound, which becomes a problem in the case where low-frequency sound is added. Furthermore, since the addition sound is generated by the resonator 42 turning a specific (sixth-order) component of the engine sound, a deep sound emphasized in a low frequency range can be arranged without the need to provide the speaker 18 and the oscillator 16. Furthermore, the installation space, the weight and the cost of the apparatus can be reduced in comparison with the construction in which a low-frequency sound is added by the speaker.

Although in the fourth embodiment the drive amount of the drive motor 46C changes in proportion to the engine rotation speed, this does not limit the invention. For example, the position of the movable wall 42C with respect to the resonance box 42B may be determined on the basis of data of a one-axis map of the engine rotation speed or a two-axis map of the engine rotation speed and the engine torque.

Furthermore, although the volume of the resonance chamber of the resonator 42 is variable in the fourth embodiment, this does not limit the invention. For example, the length or diameter of the neck portion 42A may be made variable to tune a specific component of the engine sound.

Furthermore, although in the fourth embodiment, the addition sound is generated by tuning the sound of the engine intake system, this does not limit the invention. For example, the addition sound may be generated (amplified) through a change in the frequency characteristic of the exhaust system, for example, by providing a volume-variable resonance chamber of a resonance-type muffler instead of the resonator.

Fifth Embodiment

Figure 6:
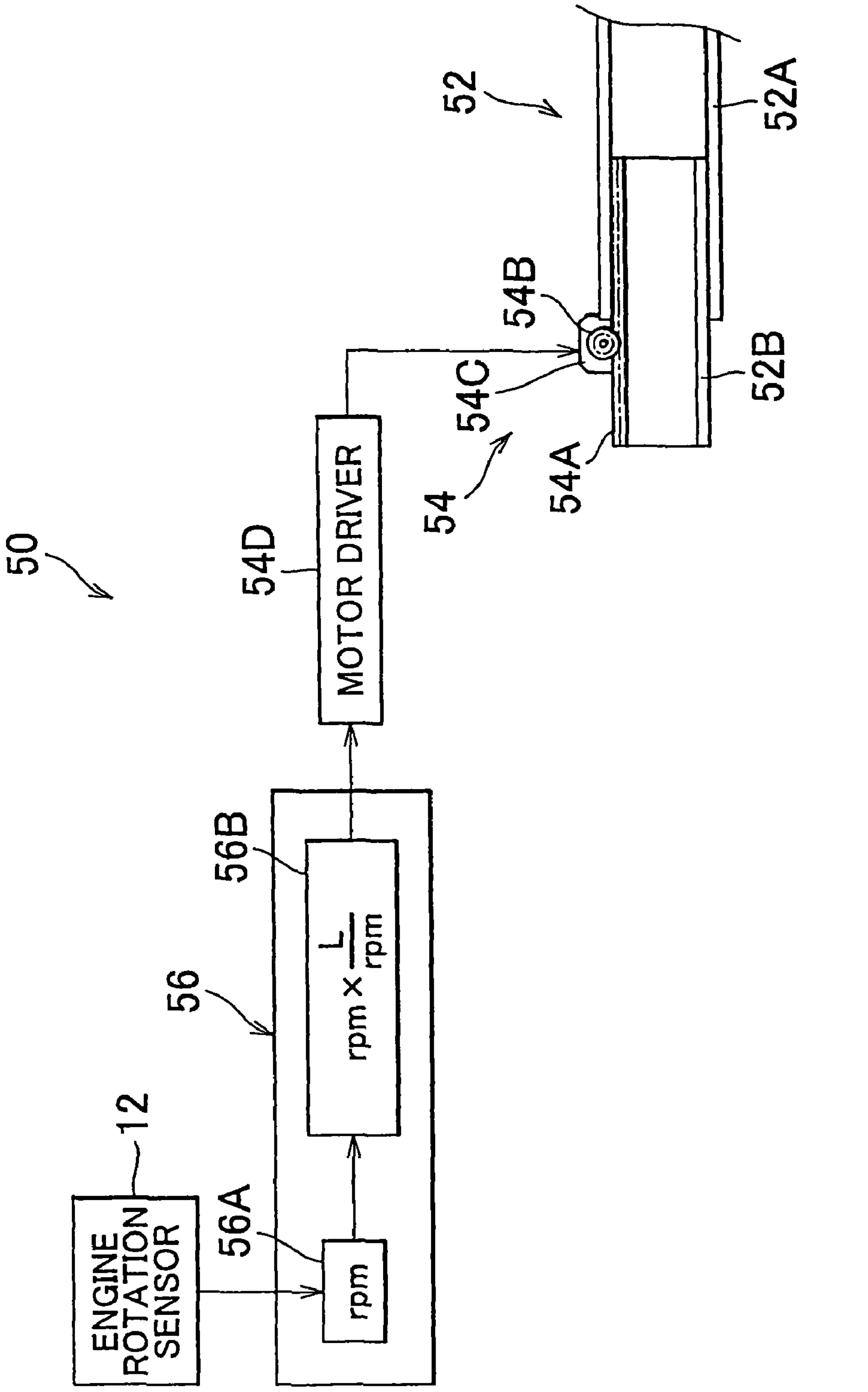
FIG. 6 is a block diagram showing an engine sound control apparatus in accordance with a fifth embodiment of the invention.

FIG. 6 shows in a block diagram an engine sound arrangement ECU 50 in accordance with a fifth embodiment of the invention. As shown in this drawing, the fifth embodiment differs from the fourth embodiment in that the engine sound arrangement ECU 50 generates an addition sound for the fundamental-order sound (brings the sound level P2 of the sixth-order component closer to the sound level P1 of the fundamental-order component) by changing the resonance characteristic of an intake duct 52 instead of the resonator 42.

The intake duct 52 is disposed at an upstream side of an air cleaner (not shown) to lead external air to the air cleaner. The intake duct 52 includes a duct body 52A whose downstream end is attached to the air cleaner, and a movable duct 52B fitted to an upstream end of the duct body 52A so as to be slidable in the axial direction of the duct body 52A. As the movable duct 52B slides with respect to the duct body 52A, the total length of the intake duct 52 decreases or increases changing the resonance characteristic.

The movable duct 52B of the intake duct 52 is driven by a drive device 54 so as to slide with respect to the duct body 52A. The drive device 54 includes a rack 54A formed on the outer peripheral surface of the movable duct 52B in the axial direction, a pinion 54B meshing with the rack 54A, and a drive motor 54C capable of rotating the pinion 54B in the forward and backward directions. The drive motor 54C is a stepping motor that is driven by a motor driver (amplifier) 54D.

The motor driver 54D is controlled by a sound arrangement ECU 56. The sound arrangement ECU 56 has a rotation number computation portion 56A that obtains the rotation speed of the engine on the basis of an output signal of an engine rotation sensor 12, and a duct elongation/contraction amount computation portion 56B that computes the amount of slide L of the movable duct 52B with respect to the duct body 52 (the rotation direction and the rotation amount of the drive motor 54C) on the basis of a result of computation of the rotation number computation portion 56A. The rotation number computation portion 56A and the duct elongation/contraction amount computation portion 56B may be constructed as circuits or as software functions. Furthermore, the amount of slide L of the movable duct 52B output by the duct elongation/contraction amount computation portion 56B may be directly computed from the signal of the engine rotation sensor 12.

As for the intake duct 52, the initial position (full length) of the movable duct 52B with respect to the duct body 52A is set so that the sound level of the sixth-order component of the engine sound reaches a sound level substantially equal to the sound pressure of the fundamental-order (fourth-order) component, in other words, so that the addition sound of the sixth-order component is generated. This setting may be a setting of attenuating the sound level of the fundamental-order component, or may also be a setting of amplifying the sound level of the sixth-order component, or may also be a combination thereof. The sound arrangement ECU 56 activates the drive motor 54C for an amount proportional to the engine rotation speed so as to maintain a state where the sound pressure of the sixth-order component of the engine sound is substantially equal to the sound pressure of the fundamental-order component thereof, in accordance with the engine rotation speed. In this embodiment, a setting is made such that the total duct length is greater during low rotation speeds than during high rotation speeds.

In a motor vehicle equipped with the engine sound arrangement ECU 50 constructed as described above, while the engine is operating, the total length of the intake duct 52 is changed in accordance with the engine rotation speed so that the sound level of the fundamental-order component of the engine sound and the sound level of the sixth-order component are substantially equal. Therefore, occupants of the motor vehicle perceive, due to the human hearing characteristic a sound of a frequency equal to a difference Δf between the frequency fa of the addition sound and the frequency fb of the fundamental-order sound, as indicated in FIG. 1B, even though a sound at that frequency has not been generated.

Thus, the engine sound arrangement ECU 50 in accordance with the fifth embodiment achieves substantially the same effect through substantially the same operation as in the engine sound arrangement ECU 40 in accordance with the fourth embodiment.

Sixth Embodiment

Figure 7:
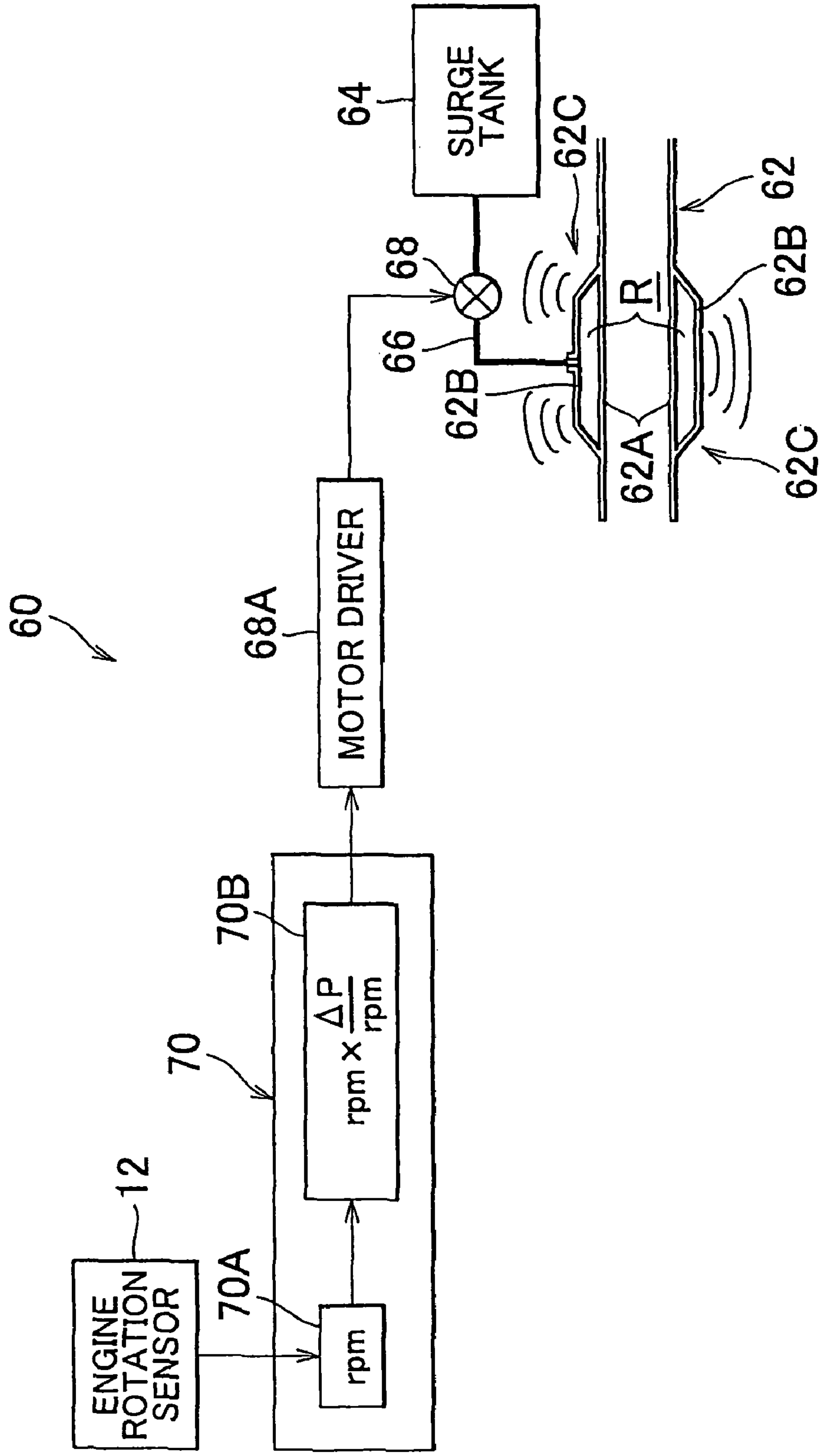
FIG. 7 is a block diagram showing an engine sound control apparatus in accordance with a sixth embodiment of the invention.

FIG. 7 shows in a block diagram an engine sound control apparatus 60 in accordance with a sixth embodiment of the invention. As shown in FIG. 7, the sixth embodiment differs from the fourth and fifth embodiments in that the engine sound control apparatus 60 generates an addition sound for the fundamental-order sound (i.e., brings the sound level P2 of the sixth-order component closer to the sound level P1 of the fundamental-order component) by changing the vibration characteristic of an intake duct 62 instead of the resonator 42

The intake duct 62 is disposed upstream of an air cleaner (not shown) so as to lead external air to the air cleaner. A portion of the intake duct 62 in the direction of an axis thereof has a double-membrane structure 62C in which a space R is formed between an inner wall 62A and an outer wall 62B. By changing the membrane rigidity (resonance frequency) in accordance with the pressure in the space R, a radiation sound of a frequency in accordance with the membrane rigidity is generated from the double-membrane structure 62C.

A vacuum pipe 66 communicating at one end with a surge tank 64, provided as a negative pressure source, is connected at the other end to the double-membrane structure 62C of the intake duct 62 so as to communicate with the space R. A control valve 68 is disposed in the vacuum pipe 66. The internal pressure (negative pressure) in the space R is adjusted in accordance with the degree of opening of the control valve 68. A drive motor (not shown), driven by a motor driver 68A, drives the valve element (not shown) of the control valve 68 to change the degree of opening of the control valve 68.

The motor driver 68A is controlled by a sound arrangement ECU 70. The sound arrangement ECU 70 has a rotation number computation portion 70A that obtains the rotation speed of the engine on the basis of an output signal of an engine rotation sensor 12, and a pressure change amount computation portion 70B that computes an amount of change ΔP in the internal pressure of the space R of the double-membrane structure 62C (the degree of opening of the control valve 68) on the based on the result of computation of the rotation number computation portion 70A. The rotation number computation portion 70A and the pressure change amount computation portion 70B may be constructed as circuits. Alternatively, the rotation number computation portion 70A and the pressure change amount computation portion 70B may also be constructed as software functions. Furthermore, the amount of change ΔP in the internal pressure of the space R output by the pressure change amount computation portion 70B may be directly computed from the signal of the engine rotation sensor 12.

As for the intake duct 62, the initial rigidity (the internal pressure of the space R) of the double-membrane structure 62C is set so that the sound level of the sixth-order component of the engine sound reaches a sound level substantially equal to the sound pressure of the fundamental-order (fourth-order) component, in other words, so that a radiation sound of the sixth-order component is generated as an addition sound. The sound arrangement ECU 70 changes the degree of opening of the control valve 68 for an amount proportional to the engine rotation speed so as to maintain a state where the sound pressure of the sixth-order component of the engine sound is substantially equal to the sound pressure of the fundamental-order component thereof, in accordance with the engine rotation speed. In this embodiment, a setting is selected such that the internal pressure of the space R is lower during low rotation speeds than during high rotation speeds.

In a motor vehicle equipped with the engine sound control apparatus 60 constructed as described above, while the engine is operating, the membrane rigidity of the double-membrane structure 62C of the intake duct 62 is changed in accordance with the engine rotation speed so that the sound level of the fundamental-order component of the engine sound and the sound level of the sixth-order component are substantially equal. Therefore, occupants of the motor vehicle perceive, due to the human hearing characteristic, a sound of a frequency equal to a difference Δf between the frequency fa of the addition sound and the frequency fb of the fundamental-order sound, as indicated in FIG. 1B, even though a sound at that frequency has not been generated.

Thus, the engine sound control apparatus 60 in accordance with the sixth embodiment achieves substantially the same effect through substantially the same operation as in the engine sound arrangement ECU 40 in accordance with the fourth embodiment.

Seventh Embodiment

Figure 8:
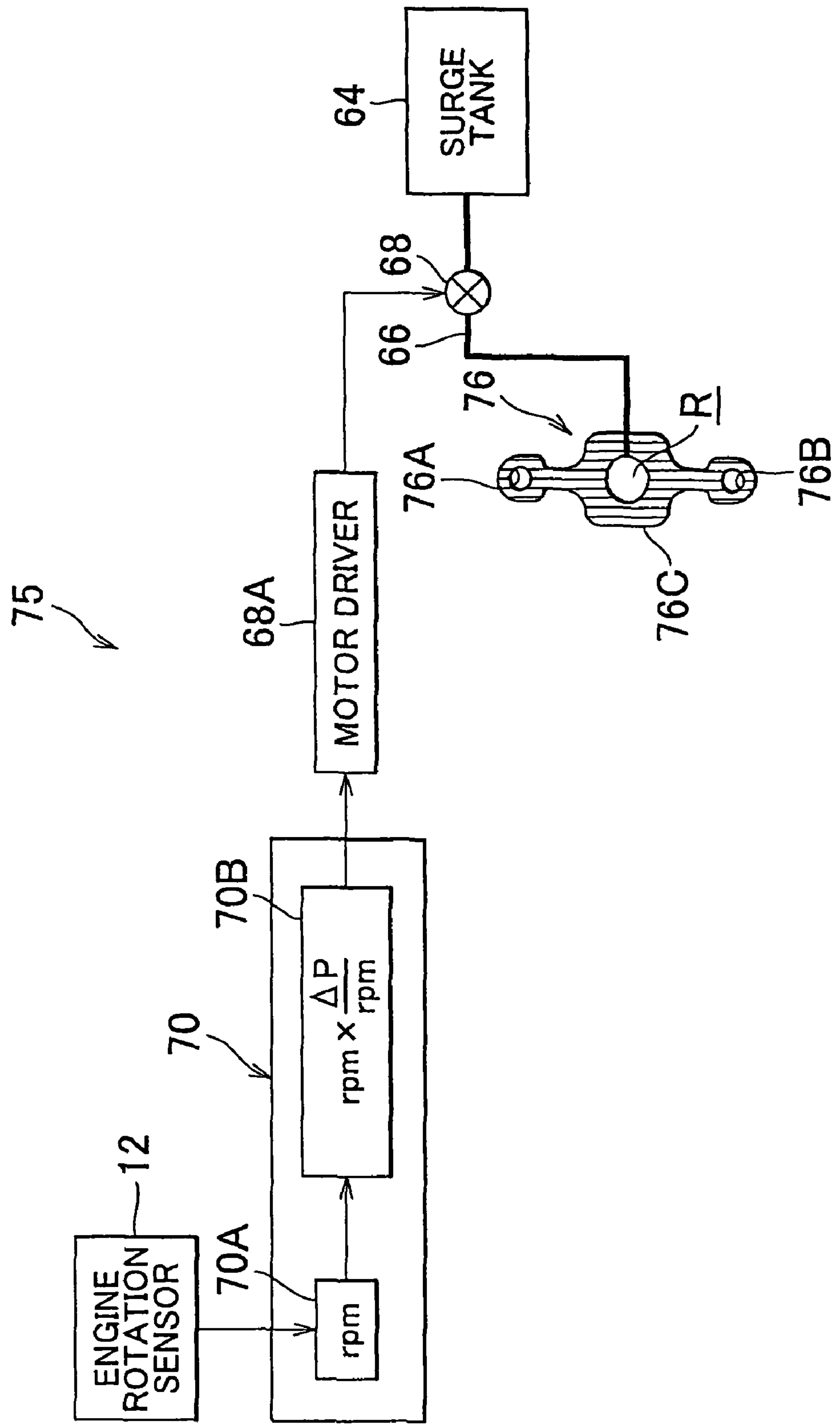
FIG. 8 is a block diagram showing an engine sound control apparatus in accordance with a seventh embodiment of the invention.

FIG. 8 shows in a block diagram an engine sound arrangement ECU 75 in accordance with a seventh embodiment of the invention. As shown in this drawing, the seventh embodiment differs from the sixth embodiment in that the engine sound arrangement ECU 75 generates an addition sound for the fundamental-order sound (i.e., brings the sound level P2 of the sixth-order component closer to the sound level P1 of the fundamental-order component) by changing the vibration characteristic of a rubber support piece 76 that supports a muffler (not shown), an exhaust system component part, on a vehicle body, instead of using the intake duct 62.

In the rubber support piece 76, a hollow portion 76C is formed between a vehicle body-side support portion 76A, which is supported on the vehicle body, and a muffler coupling portion 76B, which is coupled to the muffler. An end of the vacuum pipe 66 is connected in communication with a space R in the hollows portion R. Thus, the rubber support piece 76 is constructed so that the rigidity thereof changes in accordance with the negative pressure in the space R. Therefore, an exhaust sound (radiation sounds) in accordance with the rigidity of the rubber support piece 76 is produced from the muffler. Other constitutions of the engine sound arrangement ECU 75 are the same as the corresponding constructions of the engine sound control apparatus 60.

In a motor vehicle equipped with the engine sound arrangement ECU 75 constructed as described, the rigidity of the rubber support piece 76, which supports the muffler, is changed in accordance with the engine rotation speed while the engine is operating so that the sound level of the fundamental-order component of the engine sound and the sound level of the sixth-order component are substantially equal. Therefore, occupants of the motor vehicle perceive, due to the human hearing characteristic, a sound of a frequency equal to a difference Δf between the frequency fa of the addition sound and the frequency fb of the fundamental-order sound, as indicated in FIG. 1B, even though a sound at that frequency has not been generated.

Thus, the engine sound arrangement ECU 75 in accordance with the seventh embodiment achieves substantially the same effect through substantially the same operation as in the engine sound arrangement ECU 40 in accordance with the fourth embodiment.

Although in the seventh embodiment, the addition sound is generated by changing the rigidity of the rubber support piece 76 that supports the muffler, the invention is not limited to a muffler support-or other exhaust system component part. For example, the rigidity of a mounting rubber piece for a support in the drive system, such as an engine mount that supports an engine on the vehicle body, or the like, may be changed to generate or amplify an addition sound whose frequency difference from the fundamental-order sound is within a predetermined frequency range. Furthermore, changes in the rigidity of the rubber support piece 76, the mounting rubber piece or the like may be brought about not only by changing the internal pressure but also in other manners, for example, by changing a variable orifice diameter of a liquid-sealed mounting, or by changing the kinematic viscosity of a sealed-in electrorheological fluid through application of voltage, etc.

The invention claimed is:

1. An engine sound control apparatus comprising:

a sound output device configured to output, relative to a first sound of a fundamental-order frequency of an engine, a second sound of a frequency whose frequency difference from the fundamental-order frequency is within a predetermined range so that, due to a human hearing characteristic, a third sound of frequency that is equal to the difference between the frequency of the second sound and the frequency of the first sound is able to be perceived without actually generating the third sound.

2. The engine sound control apparatus according to claim 1, wherein the apparatus enables a sound to be arranged that is lower in frequency than the fundamental-order sound without actually generating a sound of a frequency that is lower than that of the fundamental-order sound.

3. The engine sound control apparatus according to claim 1, wherein the sound output device includes a sound signal generation portion that generates a sound signal independently of the engine, and a sound output portion that outputs the sound signal generated by the sound signal generation portion.

4. The engine sound control apparatus according to claim 1, wherein the sound output device includes an addition sound adjustment portion that changes the frequency or level of a sound caused by an action of the engine.

5. The engine sound control apparatus according to claim 1, wherein the sound added by the sound output device is a sound that is higher in frequency than the sound of the fundamental-order frequency of the range.

6. An engine sound control apparatus comprising:

a frequency detection portion that detects a frequency of a sound of an engine;

a sound output device configured to output a sound of a frequency that is in accordance with a control signal; and a control device that outputs the control signal to the sound output device so as to add to a first sound of a fundamental-order frequency of the engine, a second sound of a frequency component whose frequency difference from the fundamental-order frequency is within a predetermined range, based on a detection signal of the frequency detection portion, so that, due to a human hearing characteristic, a third sound of a frequency that is equal to the difference between the frequency of the second sound and the frequency of the first sound is able to be perceived without actually generating the third sound.

7. The engine sound control apparatus according to claim 6, further comprising a level detection portion that detects a sound level of the fundamental-order frequency of the engine, wherein the sound whose frequency difference from the fundamental-order frequency is in the predetermined range also has a sound level difference from the sound of the fundamental-order frequency that is in a predetermined range.

8. The engine sound control apparatus according to claim 6, wherein the sound output device includes a sound signal generation portion that generates a sound signal independently of the engine, and a sound output portion that outputs the sound signal generated by the sound signal generation portion.

9. The engine sound control apparatus according to claim 6, wherein the sound output device includes an addition sound adjustment portion that changes the frequency or level of a sound caused by an action of the engine.

10. The engine sound control apparatus according to claim 9, wherein the addition sound adjustment portion adjusts the frequency or level of the sound added to the sound of the fundamental-order frequency of the engine by changing a frequency characteristic of an intake system or an exhaust system of the engine.

11. The engine sound control apparatus according to claim 6, wherein the sound added by the sound output device is a sound that is higher in frequency than the sound of the fundamental-order frequency of the engine.

12. The engine sound control apparatus according to claim 6, wherein the apparatus enables a sound to be arranged that is lower in frequency than the fundamental-order sound without actually generating a sound of a frequency that is lower than that of the fundamental-order sound.

13. An engine sound control apparatus comprising:

a controller that changes a frequency characteristic of a site of generation or transmission of a first engine sound in accordance with an engine rotational speed, wherein a difference in sound level between a sound of a fundamental-order frequency and a second sound of a frequency component of an order different from the order of the fundamental-order frequency becomes equal to a predetermined level difference in a cabin so that, due to a human hearing characteristic, a third sound of a frequency that is equal to the difference between the frequency of the second sound and the frequency of the fundamental order sound is able to be perceived without actually generating the third sound.

14. The engine sound control apparatus according to claim 13, wherein the apparatus enables as sound to be arranged that is lower in frequency that the fundamental-order sound without actually generating a sound of a frequency that is lower than that of the fundamental-order sound.

15. A method of controlling an engine sound control apparatus comprising:

determining a fundamental-order frequency of a first sound from an engine; and generating a second sound of a frequency whose frequency difference from the fundamental-order frequency is within a predetermined range so that, due to a human hearing characteristic, a third sound of a frequency that is equal to the difference between the frequency of the second sound and the frequency of the first sound is able to be perceived without actually generating the third sound.

16. The engine sound control apparatus according to claim 15, wherein the apparatus enables a sound to be arranged that is lower in frequency than the fundamental-order sound without actually generating a sound of a frequency that is lower than that of the fundamental-order sound.

17. The method according to claim 15, further comprising:

generating a sound signal independently of the engine, wherein the engine-independent generated sound is added to the sound of the fundamental-order frequency of the engine.

18. The method according to claim 15, further comprising:

changing the frequency or level of the sound caused by an action of the engine.

19. The method according to claim 15, wherein the generated sound is higher in frequency than the sound of the fundamental-order frequency of the engine.

20. A method of controlling an engine sound control apparatus comprising:

detecting a frequency of a first sound of an engine;

determining a fundamental-order frequency of the first sound of the engine;

generating a second sound of a frequency component that differs in frequency from the fundamental-order frequency within a predetermined frequency range; and adding the second sound of the frequency component to the first sound of the fundamental-order frequency of the engine so that, due to a human hearing characteristic, a third sound of a frequency that is equal to the difference between the frequency of the second sound and the frequency of the first sound is able to be perceived without actually generating the third sound.

21. The method according to 20, further comprising:

detecting a sound level of the fundamental-order frequency of the engine, wherein the generated sound of the frequency component that is added to the sound of the fundamental-order frequency of the engine also has a sound level difference from the sound of the fundamental-order frequency in a predetermined range.

22. The method according to claim 20, further comprising:

generating a sound signal independently of the engine, wherein the engine-independent generated sound is added to the sound of the fundamental-order frequency of the engine.

23. The method according to claim 20, further comprising changing the frequency or level of the sound caused by an action of the engine.

24. The method according to claim 23, wherein the frequency or amplitude of the sound added to the sound of the fundamental-order frequency of the engine is adjusted by changing a frequency characteristic of an intake system or an exhaust system of the engine.

25. The method according to claim 20, wherein the generated sound is higher in frequency than the sound of the fundamental-order frequency of the engine.

26. The engine sound control apparatus according to claim 20, wherein the apparatus enables a sound to be arranged that is lower in frequency than the fundamental-order sound without actually generating a sound of a frequency that is lower than that of the fundamental-order sound.

27. A method of controlling an engine sound control apparatus comprising:

changing a frequency characteristic of a site of generation or transmission of an engine sound in accordance with an engine rotational speed, wherein a difference in sound level between a first sound of a fundamental-order frequency and a second sound of a frequency component of an order that is different from the order of the fundamental-order frequency becomes equal to a predetermined level difference in a cabin so that, due to a human hearing characteristic, a third sound of a frequency that is equal to the difference between the frequency of the second sound and the frequency of the first sound is able to be perceived without actually generating the third sound.

28. The engine sound control apparatus according to claim 27, wherein the apparatus enables a sound to be arranged that is lower in frequency than the fundamental-order sound without actually generating a sound of a frequency that is lower than that of the fundamental-order sound.

* * * * *